(12) United States Patent  
Raami

(10) Patent No.: US 6,493,930 B1
(45) Date of Patent: Dec. 17, 2002

(54) FRAMING STATION ARRANGEMENT

(75) Inventor: Juha Raami, Helsinki (FI)

(73) Assignee: ABB Research Ltd., Zurich (CH)

( * ) Notice: Subject to any disclaimer, the term of this patent is extended or adjusted under 35 U.S.C. 154(b) by 73 days.

(21) Appl. No.: 09/584,493

(22) Filed: Jun. 1, 2000

Related U.S. Application Data

(62) Division of application No. 09/402,450, filed as application No. PCT/FI98/00309 on Apr. 8, 1998.

(30) Foreign Application Priority Data

Apr. 8, 1997 (FI) .................................................. 971461

(51) Int. Cl.$^7$ ............................................... B62D 65/00
(52) U.S. Cl. ............................ 29/783; 29/791; 29/795; 29/281.5; 29/714; 228/49.1; 228/4.1
(58) Field of Search ................................ 29/897.2, 464, 29/466, 467, 787, 795, 824, 559, 784, 799, 714, 281.5, 783, 791; 228/49.1, 49.6, 4.1, 6.1

(56) References Cited

U.S. PATENT DOCUMENTS

| 4,667,866 A | | 5/1987 | Tobita et al. |
| 4,946,089 A | | 8/1990 | Baulier et al. |
| 5,011,068 A | | 4/1991 | Stoutenburg et al. |
| 5,191,958 A | * | 3/1993 | Tolocko .................... 29/799 |
| 5,397,047 A | * | 3/1995 | Zampini .................... 228/6.1 |
| 5,427,300 A | | 6/1995 | Quagline |
| 5,855,060 A | * | 1/1999 | Hollebrands et al. ......... 29/771 |
| 5,940,961 A | * | 8/1999 | Parete ......................... 29/784 |
| 5,943,768 A | * | 8/1999 | Ray ............................. 29/822 |

FOREIGN PATENT DOCUMENTS

| DE | 4418755 | | 11/1995 |
| GB | 2304649 A1 | * | 3/1997 |
| WO | WO-9532886 A1 | * | 12/1995 |

* cited by examiner

Primary Examiner—S. Thomas Hughes
Assistant Examiner—Jermie E. Cozart
(74) Attorney, Agent, or Firm—Arent Fox Kintner Plotkin & Kahn, PLLC

(57) ABSTRACT

A framing station arrangement that includes a bottom plate support device to receive a bottom plate of the car body to be attached thereto. An engaging robot brings separate components of the car body into engagement with the bottom plate. Preassembly devices are used to preassemble the separate components of the car body to the bottom plate and/or to each other in order to obtain the external shape of the car body. A support system having multiple separate framing elements used to support the preassembled car body. At least one other engaging robot is used to bring at least a part of the framing elements into engagement with the support system and/or another framing element. A locking unit that joins at least two separate framing elements together and to the bottom plate support device or at least to three other framing elements to form a support net.

21 Claims, 17 Drawing Sheets

FRAMING STATION ARRANGEMENT

This application is a divisional application filed under 37 CFR § 1.53(b) of parent application Ser. No. 09/402,450, filed Nov. 30, 1999, which is a 371 of PCT/Fl98/00309, filed Apr. 8,1998.

FIELD OF THE INVENTION

The present invention relates to a method for assembling a car body, and more precisely to a method for framing of car body components. The invention relates further to an arrangement and an apparatus for use in car body assembly.

BACKGROUND OF THE INVENTION

In the manufacture of cars, especially when manufacturing the bodies of the cars the conventional systems comprise a body assembly line, on which the bodies are assembled and forwarded as the assembly work proceeds. A framing station is positioned on said assembly line, said framing station forming one of the key elements of the assembly line. Said framing station is used for accurately positioning body components, such as a bottom plate, side panels, rear and front cross members of the body, engine compartment, roof etc., relative to each other. The body components may have been loosely preassembled in the previous stages in the assembly line. Said framing station is used also for welding of the accurately positioned body components together to form a solid car body.

A conventional framing station system usually comprises a heavy and fixedly mounted frame (or gage) structure enclosing the framing station and suitable rigid holding means for holding the loosely preassembled body components together during the welding operations.

FIG. 1 is a schematic presentation of one prior art framing arrangement in which heavy jigs are utilized, It is noted that the heavy frame structure has been omitted from FIG. 1 to clarify the general presentation. The prior art jigs such as disclosed by FIG. 1 do usually have a weight which exceeds 1000 Kg per a jig. This leads to a heavy and costly apparatus for the handling thereof during the car body assembly operations.

U.S. Pat. No. 4,667,866 (Tobita et al.) discloses a framing station mounted fixedly on an assembly line. This prior art framing station has a corresponding heavy frame structure as was described above and utilizes several jigs which are moved into and within and out from the framing station or main assembly station. More precisely, the jigs are moved by an independent conveyor each to the main framing station and subsequently by a special, fixedly mounted positioning devices of a "body assembler" within the framing station. The system comprised a heavy frame construction, and a plurality of different kinds of conveyors and fixedly mounted handling apparatus for the substantially large and heavy jigs. Therefore the flexibility of the system is not considered to be adequate to fulfil the requirements set for a flexible manufacture of car bodies.

According to one another approach, disclosed eg. by U.S. Pat. No. 5,011,068 (Stoutenburg et al.) and U.S. Pat. No. 5,427,300 (Quagline), essentially rigid and heavy pivotable arms or clamps are mounted on the top portion of the frame, usually such that they can be pivoted upwards and downwards about an essentially horizontal axis. When said arms are pivoted down to engage the loosely assembled body, they will rigidly clamp the body components (or members) together for the subsequent welding operations.

The above described known systems have various disadvantages. In most cases the jigs or the clamping arms are adapted to fit one body model only, and thus they have to be changed if other models are produced on the same manufacturing line. The remarkable weight of the jigs makes the moving and/or change of them complex and difficult and expensive to arrange. This all means limited possibilities for producing different car models in a same framing station. Eg. in so called revolver stations using clamping arms the number of different models is usually restricted to four. This in turn is against the modern ideas of so called flexible manufacturing, according to which the manufacturing systems should allow as high flexibility in view of various car models as possible. In addition, even though some prior art framing stations allow framing of several models in one framing station, the number of different models is generally still restricted to those models which can be formed on the same bottom plate of one single car body type.

In addition, the conventional framing stations as discussed above are expensive and the built-up time thereof (ie. the built-up of the complex and heavy frame construction and the different special conveyors) is remarkable long. As the expected life time of one single car model has shortened, and the amount of different car models has increased, the total number of individual body models to be produced has dropped dramatically. Therefore the built-up time and the costs of the conventional framing stations adapted only for one or for few car models only are far too high.

Furthermore, due to the heavy and space requiring jigs or clamping arms substantially covering the entire car body, the accessibility of the body itself, for example for the welding operations, is poor.

The rigid and for a certain car model or models customized prior art framing stations are built from special and unique components. In case of a machine breakdown, the repair usually needs special skills and/or unique replacement parts. This is a serious disadvantage, since even a minor failure in the framing station may lead into a situation, in which one of the key components of the car manufacturing might be out of operation for an essentially long time period. This can have serious effects for the entire manufacture of this certain car model, or several models. Even the car manufacturer as whole may suffer badly from this, as this one single failure may have disadvantageous effects eg. to the logistics management and reputation of the company.

There has been various prior art attempts to overcome the above and other disadvantages of the conventional systems. From these WO publication 95/132886 discloses an arrangement which utilizes five or six holding frames, wherein the body will become cubically surrounded and supported from all sides thereof by means of said holding frames. At least some of the body components are attached to the holding frames prior to the assembly, and they are brought to the framing station and engaged with the body by means of one of said holding frames, which in turn is moved by a manipulator. The holding frames are rigidly attached to each other by positioning devices in the corners thereof such that they are positioned in an exact 90° angle relative to each other. As mentioned, this holding frame assembly surrounds the car body cubically from four sides and from the top.

However, it is considered that such arrangement would form a too heavy construction to be handled by conventional manipulators and especially by industrial robots, which in most cases are only capable of handling of loads less than 300 kg, and usually less than 200 kg. If the costs of the required apparatus are taken under consideration, the increased requirements for the load capacity requirements will rapidly increase costs of the required manipulators or industrial robots too high to be realistic. Thus, when several of them are required per one framing station, this will cause such an increase in costs that the arrangement according to WO 95/32886 is no longer considered as economically profitable, if possible at all.

In addition to the heavy structure, the holding frame of WO 95/32886 surrounds the car body in a manner which hinders the accessibility to the body and thus makes the welding operations more difficult to perform. The general construction of this supporting frame is also such that the beams of the holding frames are spaced well apart from the body, and thus different longitudinal supporting elements has to be used between the beams and the body. This increases further the weight, size and the complicity of this known structure. As the size and weight of one single holding frame component is essentially big due to the general shape and heavy construction thereof, the number of different holding frame components needed for several body models require a remarkable area for storage. Furthermore, the body components has to be preassembled into the holding frame components in a separate station, which means one additional step for the framing process. The disclosed locking arrangement requires also exact 90° joints between the frame components and a complex positioning device in each of the corners thereof.

Thus there is still a need for an improved framing method and arrangement and apparatus which could allow a flexible manufacture of car bodies without the above mentioned drawbacks of the prior art systems.

SUMMARY OF THE INVENTION

Accordingly, it is an object of the present invention to overcome the disadvantages of the prior art arrangements and to provide an improved solution for enabling a flexible car body framing.

It is an object of the present invention to provide a method and arrangement by means of which it is possible to move the required supporting means by a standard industrial robot.

It is an object of the present invention to provide a method, an arrangement and an apparatus which enables a use of a net-like supporting structure which is assembled from several separate supporting elements, said net-like structure allowing a good accessibility to the body.

It is an object of the present invention to provide a method, an arrangement and an apparatus which minimizes the set-up times of a framing station between different car body models.

It is an object of the present invention to provide a method and an arrangement by means of which it is possible to avoid essentially long reparation times in case of a machine failure in the arrangement according to the present invention.

It is an object of the present invention to provide a method, an arrangement and an apparatus which provides an improved solution for locking several support elements to each other and to form a clamping net structure for supporting the car body.

It is an object of the present invention to provide a method and an arrangement which saves the floor space and by means of which is possible to shorten the entire length of a car body assembly line.

Other objects and advantages of the present invention will be brought out in the following part of the specification taken in conjunction with the accompanying drawings.

The invention is mainly based on the idea that by providing a new type light-weighted supporting means network consisting of a number of separate custom shaped and dimensioned support elements rigidly locked to each other in an inventive manner around a preassembled car body, wherein robots or similar means are utilized both in body component and support elements handling, an improved flexible and automatic solution for car body framing is provided.

More precisely, the present invention is characterized by what is disclosed in the appended claims.

According to a preferred embodiment of the present invention, a method for framing a car body from a plurality of separate body components comprises steps for attaching a bottom plate of the car body to a bottom plate support means, bringing at least a part of the separate body components into engagement with the bottom plate by means of a robot or similar apparatus, preassembling the body components relative to the bottom plate and/or relative to each other so that a preassembled car body having the external shape of the car body becomes achieved, and forming a support means from a plurality of separate support elements for supporting the preassembled car body such that at least a part of the support elements is brought into engagement with the bottom plate support means and/or another support element by means of a robot or similar apparatus. The support elements are clamped to each other in order to form a support means net, wherein the forming of the support means net is accomplished such that each of the support elements is clamped either to at least two other support elements and to the bottom plate support means or to at least three other support elements by means of locking unit means provided in the support elements.

In addition, the invention provides a framing station arrangement for car body framing from a plurality of separate body components, comprising a bottom plate support means for receiving and supporting a bottom plate of a car body, attachment means for clamping the bottom plate on the bottom plate support means, a robot or similar apparatus for bringing at least one of the separate body components into engagement with the bottom plate, means for preassembling said body components relative to the bottom plate and/or relative to each other so that the external shape of the car body is achieved, a support means formed by a plurality of separate support elements for supporting the preassembled car body, and a robot or similar apparatus arranged to bring at least one of the support elements of said plurality of support elements into engagement with said bottom plate support means and/or at least one another support element. In accordance with the invention the support means are arranged to form a support means net such that each of the support elements forming said support means net is clamped either to at least two other support elements and to said bottom plate support means or to at least three other support elements by means of locking unit means provided in the support elements.

A support apparatus for car body framing from a plurality of separate body components is comprising in combination the following elements: a bottom plate support means for receiving and supporting a bottom plate of a car body, attachment means for clamping the bottom plate on the bottom plate support means, attaching means for preassembling the separate body components relative to the bottom plate and/or relative to each other so that the external shape of the car body is achieved, support means formed by a plurality of separate support elements arranged to be movable by a robot or similar apparatus and clamped to each other to form a support means net for supporting the preassembled car body such that each of the support elements forming the support means net is clamped either to at least two other support elements and to the bottom plate support means or to at least three other support elements by means of locking unit means provided in the support elements, and gripping means for removably holding at least a part of the body components by the support means net.

Said support means net is preferably arranged such that the construction and shape thereof follows essentially the shape and construction of the car body while allowing an essentially good accessibility to the car body for the subsequent assembly operations.

It is noted that the in this context used definitions "preassembling", "preassembly" or the equivalences thereof are intented to cover all such preparative operations, by means of which the car body will become lightly preassembled ie. the adjacent body members will become held relative to each other by more or less temporary binding means, such as clinching, welding, gluing, riveting or any other appropriate means.

Several advantages are obtained by means of the present invention, as the solution provides a reliable, automatic and flexible manner for car body framing.

In principle, the flexible solution according to the invention allows to produce car bodies in an arbitrary order such that the series size may be set to be as low as 1. There are no restrictions in view of the bottom plate either, and thus even different bottom plates may be used in subsequent operation cycles. In addition, as the arrangement utilizes standard components, such as standard industrial robots of substantially low costs, the maintenance and repair thereof as well as all changes for instance in the number and layout of the robots are easy and fast to perform. Thus invention provides a high level of automation by reasonable costs.

The size and weight of single framing elements forming the framing structure is reduced so much that even the ordinary industrial robots are capable of handling them. The assembly of a framing net structure from the separate framing elements is easy and fast to perform. Despite this the inventive framing structure will provide a rigid support for the body components or members while allowing a good accessibility, for instance for the welding robots. As the size of the framing elements is reduced, and the structure thereof is simplified, the storage space requirements thereof are also reduced. In addition, single framing elements are essentially cheap to manufacture and easy to handle and store, which enables a wide variety of custom fitted framing elements for a wide range of different car model in a manner which is economically more reasonable than in the known arrangements.

In the following the present invention and the other objects and advantages thereof will be described in an exemplifying manner with reference to annexed drawing, in which similar reference characters throughout various figures refer to similar features.

DETAILED DESCRIPTION OF THE DRAWINGS

Figure 2:
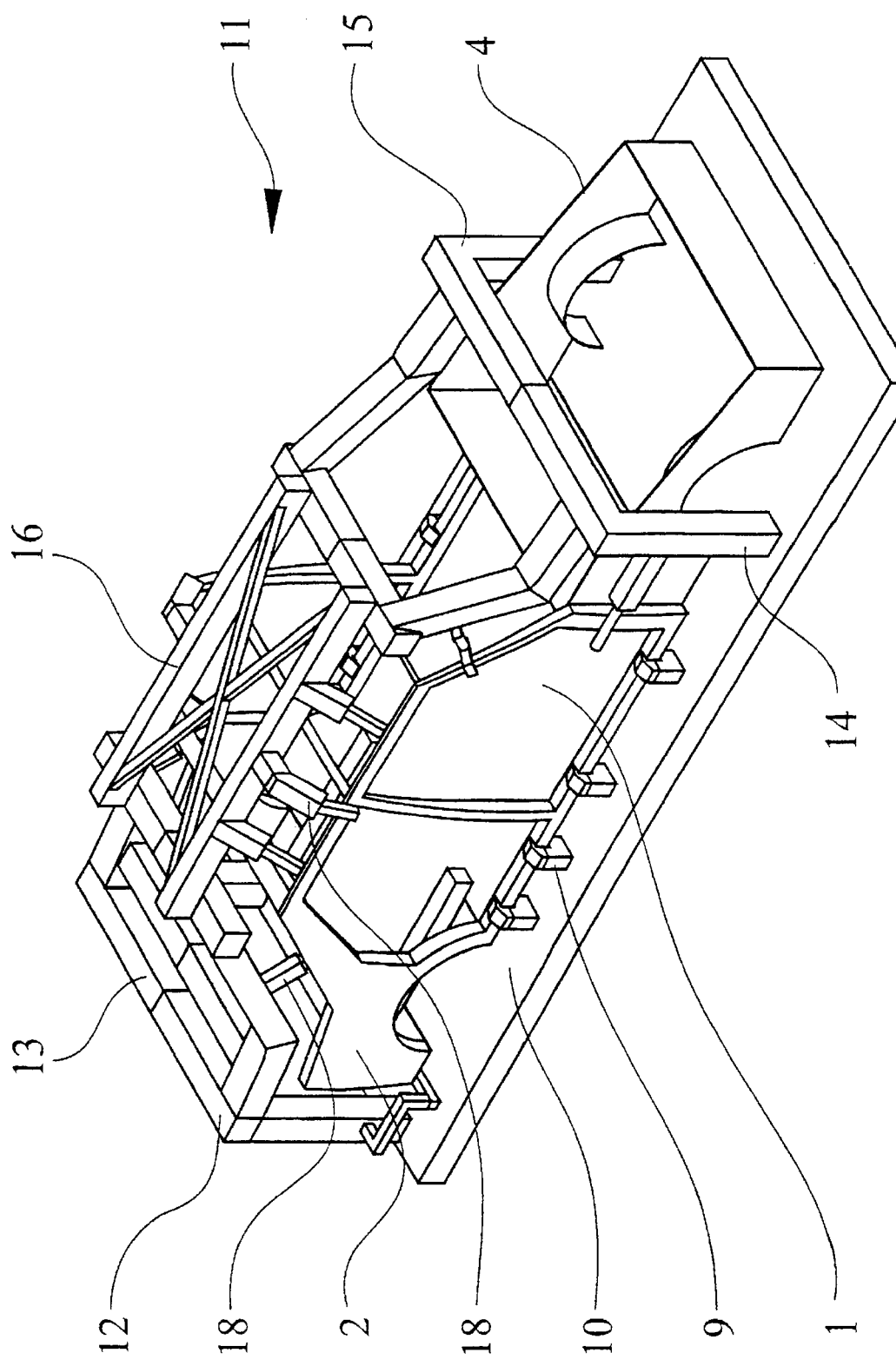
FIG. 2 is a schematic perspective view of a preferred embodiment of the net-like supporting structure according to the present invention.

Firstly it is noted, that by terms "supporting means net" or "clamping net" or "framing net" it is intented to mean the framing structure, such as designated by 11 in FIG. 2, in its assembled form, and by terms "support element" or "framing element" it is intented to mean those parts or components, such as parts 12, 13, 14, 15 and 16 in FIG. 2, which form the framing or clamping net when clamped together.

A schematic perspective view of FIG. 2 discloses one preferred support means net 11 disposed around loosely fit body components of a car body. A bottom plate 1 of the body is disposed and attached on a bottom plate support means or a bed means 10 by suitable attachment means 9, such as clamps, brackets, clips etc. The other body components, such as side panels 2 and 3 and possible separate front end cross members 4, have been loosely preassembled, such as clinched or glued, into engagement with said bottom plate 1 to form the basic external shape of a car body. This preassembly operation will be discussed in more detail in connection with FIG. 3b.

Figure 1:
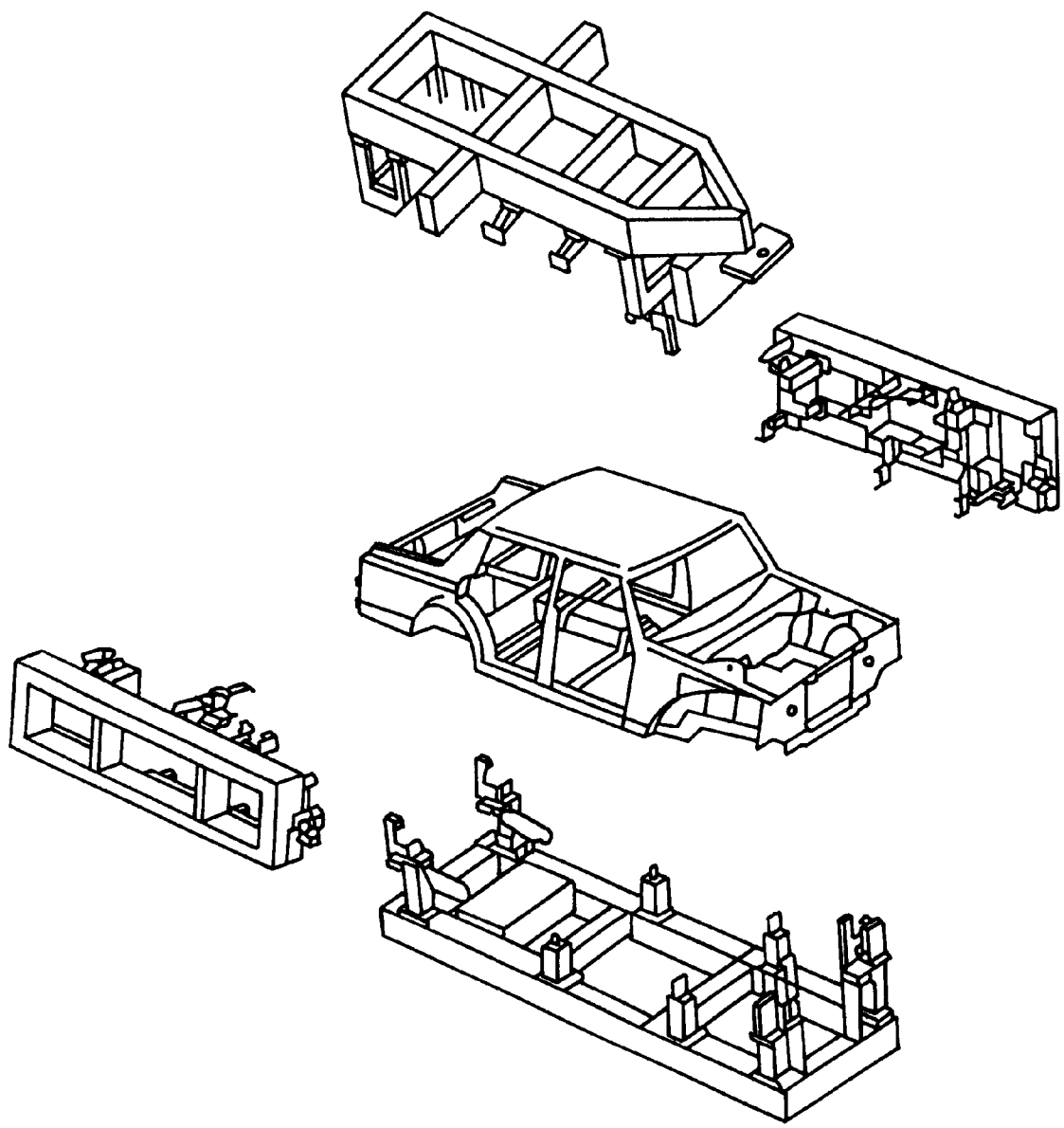
FIG. 1 is a schematic presentation of one prior art framing station.

The support means net 11 of FIG. 2 comprises 5 separate support elements. Each of the support elements is designed to form a light but a rigid subelement of the support net 11. In the example of FIG. 1 the individual subelements, such as the right hand side front support element 14, are formed by welding closed square beam portions in appropriate positions relative to each other. This subelement structure provides a good solidity and stability, while providing a light weighted design which is easy and economical to accomplish for many different car body models and external shapes. Alternative designs for an individual support elements will be discussed further in connection with FIG. 7.

From the several separate support elements the elements 14 and 15 are positioned in both, i.e. right and left sides of the front end of the car body such that the other element 15 is positioned on one side and is extending thereof towards the center line of the body and the roof of the body, and the other element 14 is correspondingly positioned in the opposite side of said center line. Correspondingly, two other support elements 12 and 13 are positioned at the rear end of the body. A fifth support element or roof support element 16 connects the rear and front end elements such that a rigid support means net 11, ie. a clamping net, is provided for supporting, ie. framing, the car body during the welding operations. The support elements 12, 13, 14 and 15 are clamped to the bed means 10 and to two other support elements (eg. element 12 to bed means 10 and to elements 13 and 16, element 14 to bed means 10 and to elements 15 and 16 etc.). The roof support element 16 is clamped to each of the other four support elements 12–15 from the engagement points therebetween. Thus a net structure or a lattice structure is provided which forms a rigidly from separate elements clamped structure. As can be readily noted from FIG. 2, the joints between the different partial elements of the net 11 are such that good rigidness and stability is obtained.

Gripping means or so called "finger units" 18 of the support elements are also shown. These are adapted to grip to the body components and they are used for positioning and holding the body components during the framing operations. The required number and suitable positioning of the gripping means 18 can be freely designed for each different car body model. The gripping means 18 can be eg. pneumatic or hydraulic actuators comprising suitable gripping fingers.

According to one alternative (not shown), the support elements are provided with bearing surfaces adapted to engage the car body in suitable positions such that the body components will become positioned and rigidly held by these for the subsequent operations. The support elements may also be shaped such as to closely follow the general shape of the car body, and thus to provide an even and distributed support through the entire bearing surface thereof. Various combinations of the above alternatives are also possible for the positioning and holding of the body components.

As can be seen from FIG. 2, the sides of the car body will remain fully open. This is enabled by the invention, since the light-weighted framing elements 12 to 16 are designed such that they will essentially follow the contour of the car body on the top faces thereof while the position of the engagement (locking) points of the framing elements are not bind to any particular positions, such as to the corners of the framing arrangement 11. This enables the designer of a clamping net 11 for a certain car model to optimize the various parameters, such as the shape, dimensions, clamping points etc. of each single framing element as well as the number of required elements forming the supporting means net 11 in a manner which enables as light-weighted, compact, simple and economical construction as possible.

Figure 4A:
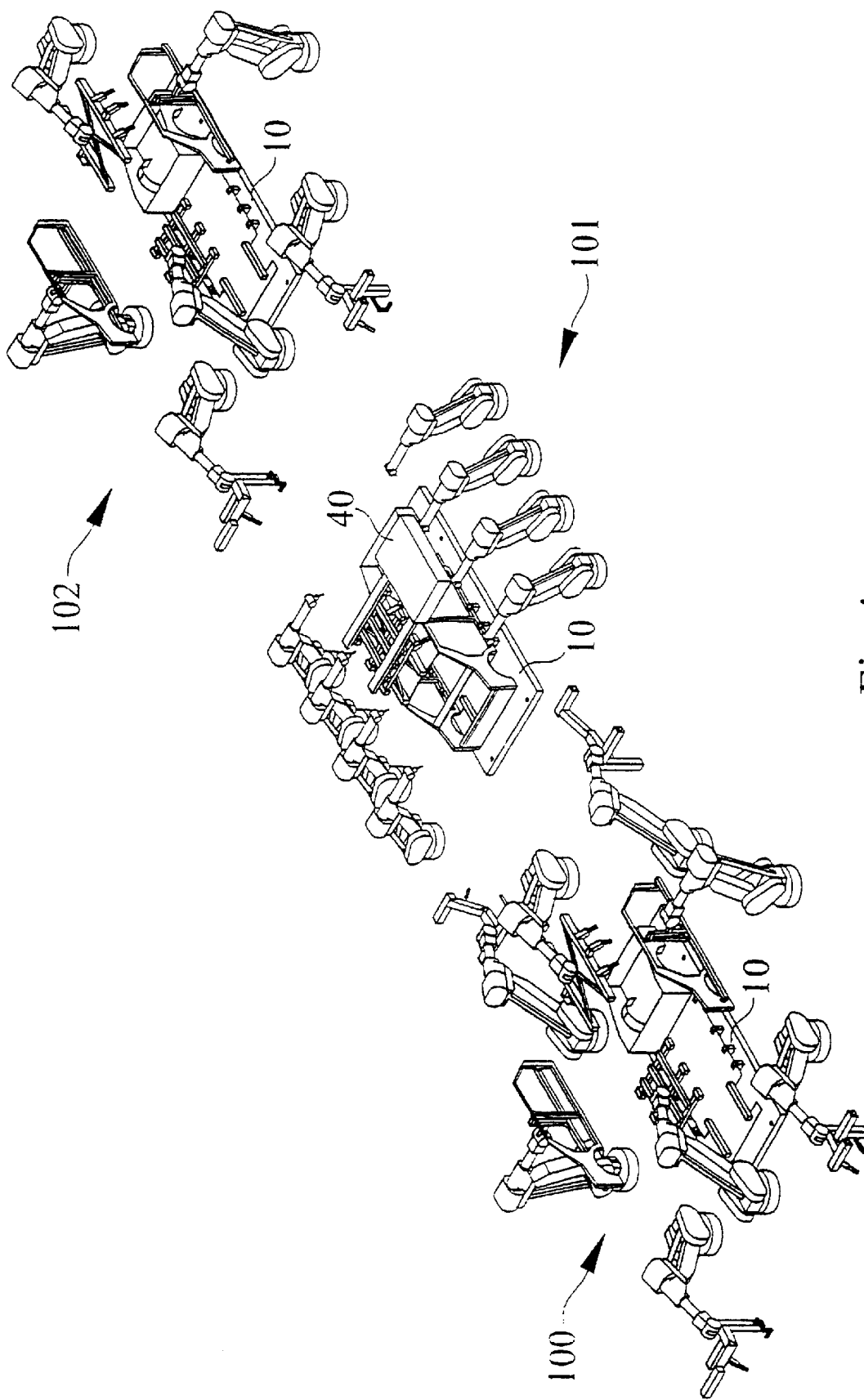
FIGS. 4a, 4b, 4c, 4d, 4e and 4f are schematic perspective views of the operational principles according to another embodiment of the present invention.
Figure 4B:
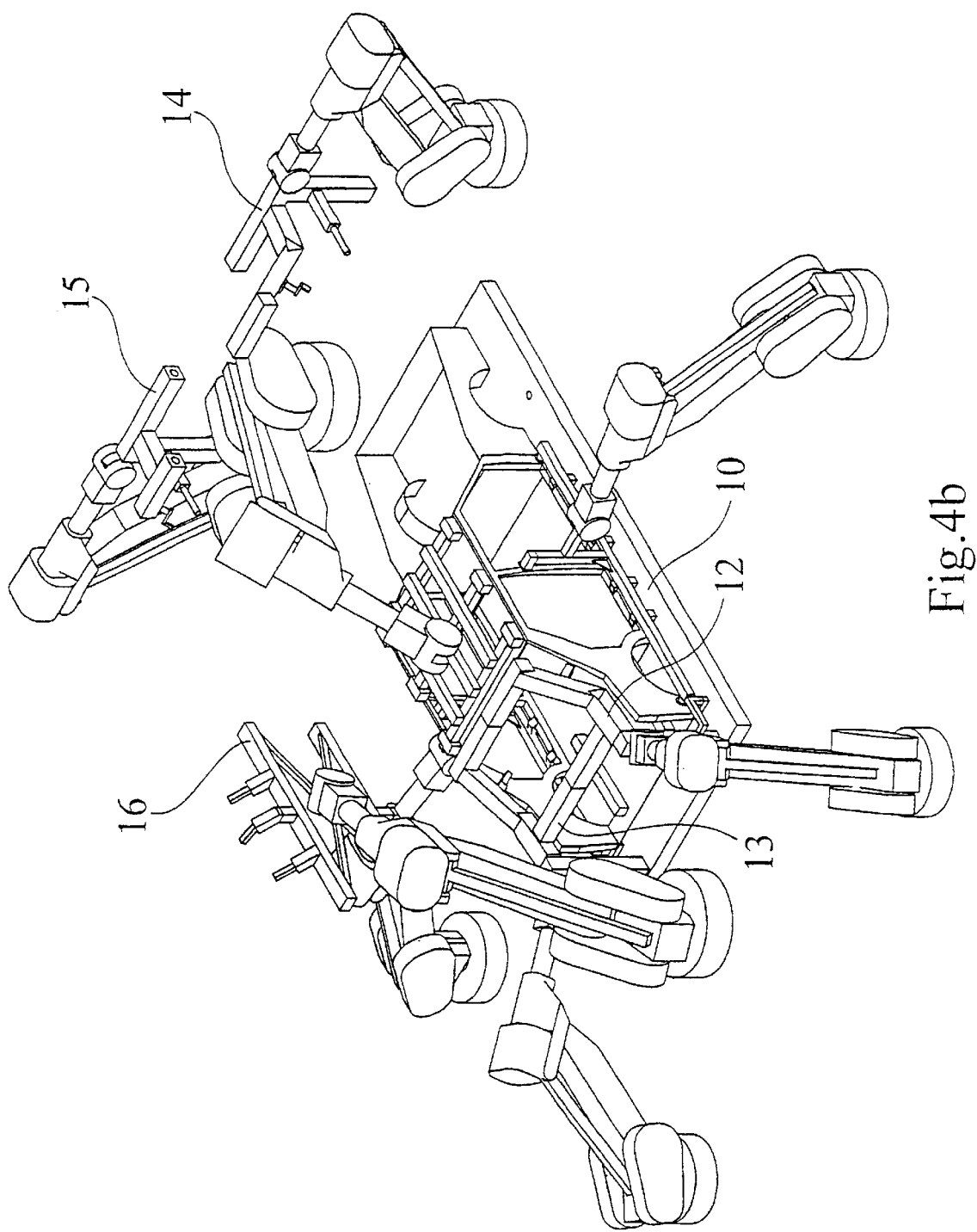
Figure 4C:
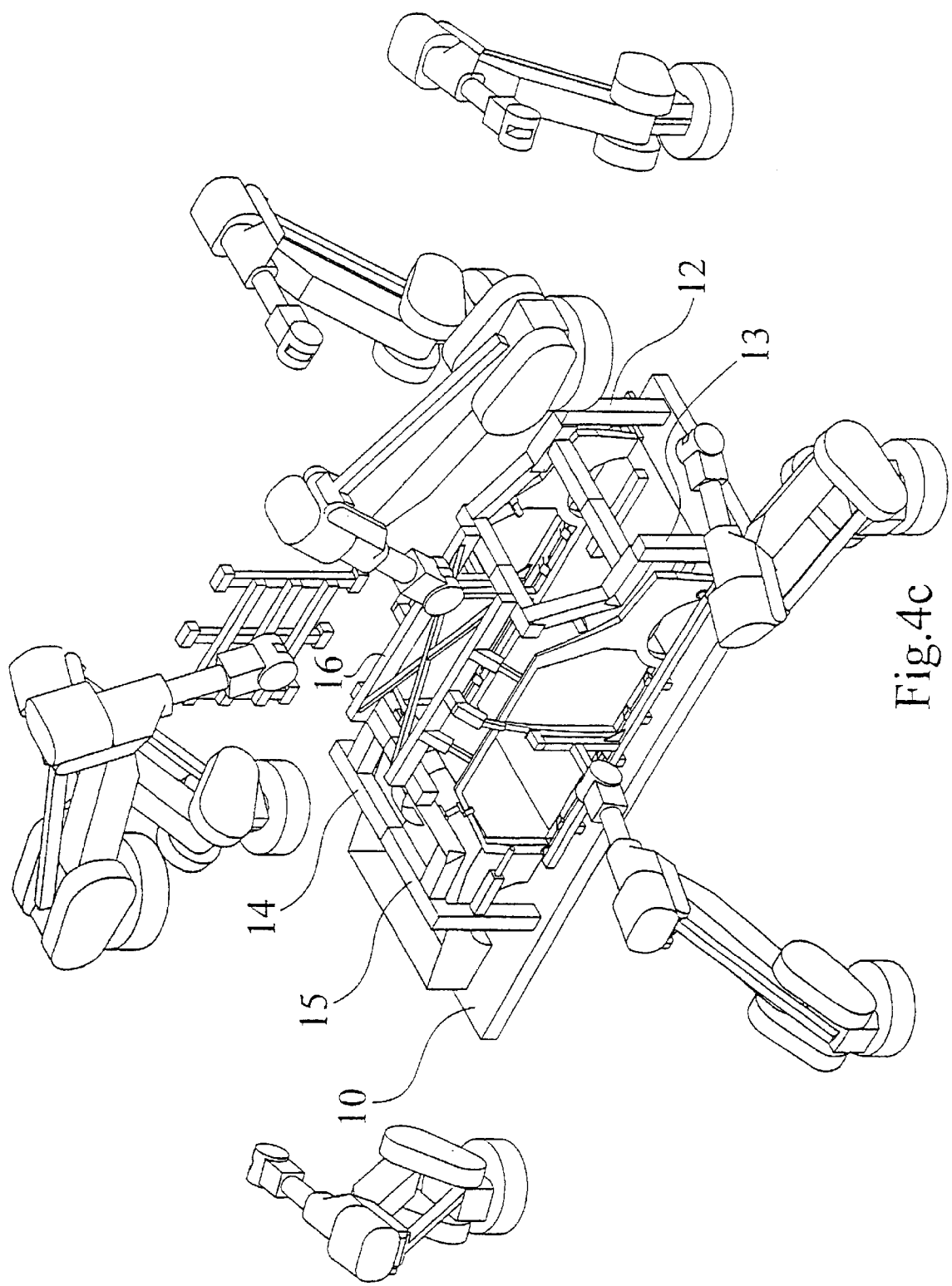
Figure 4D:
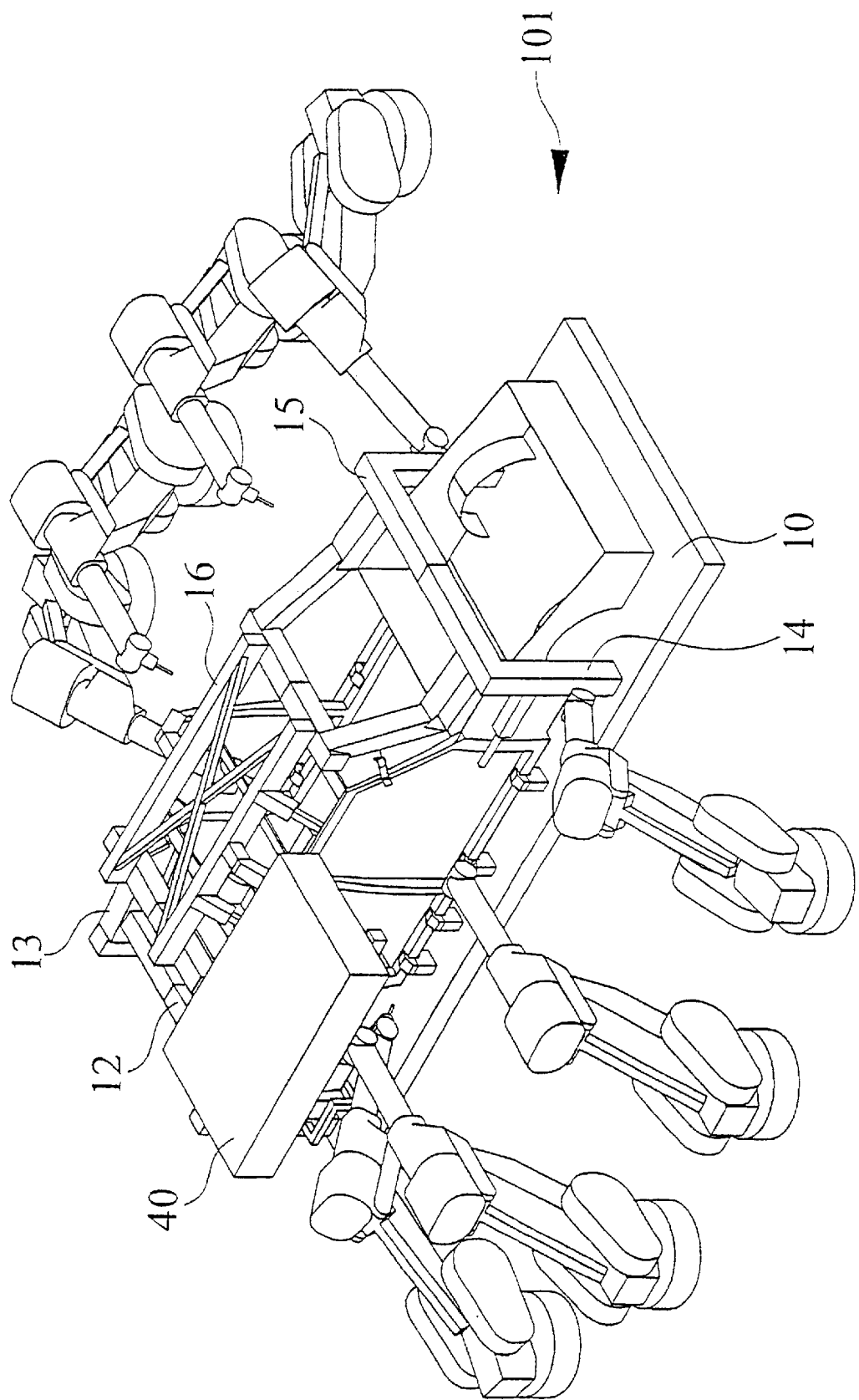
Figure 4E:
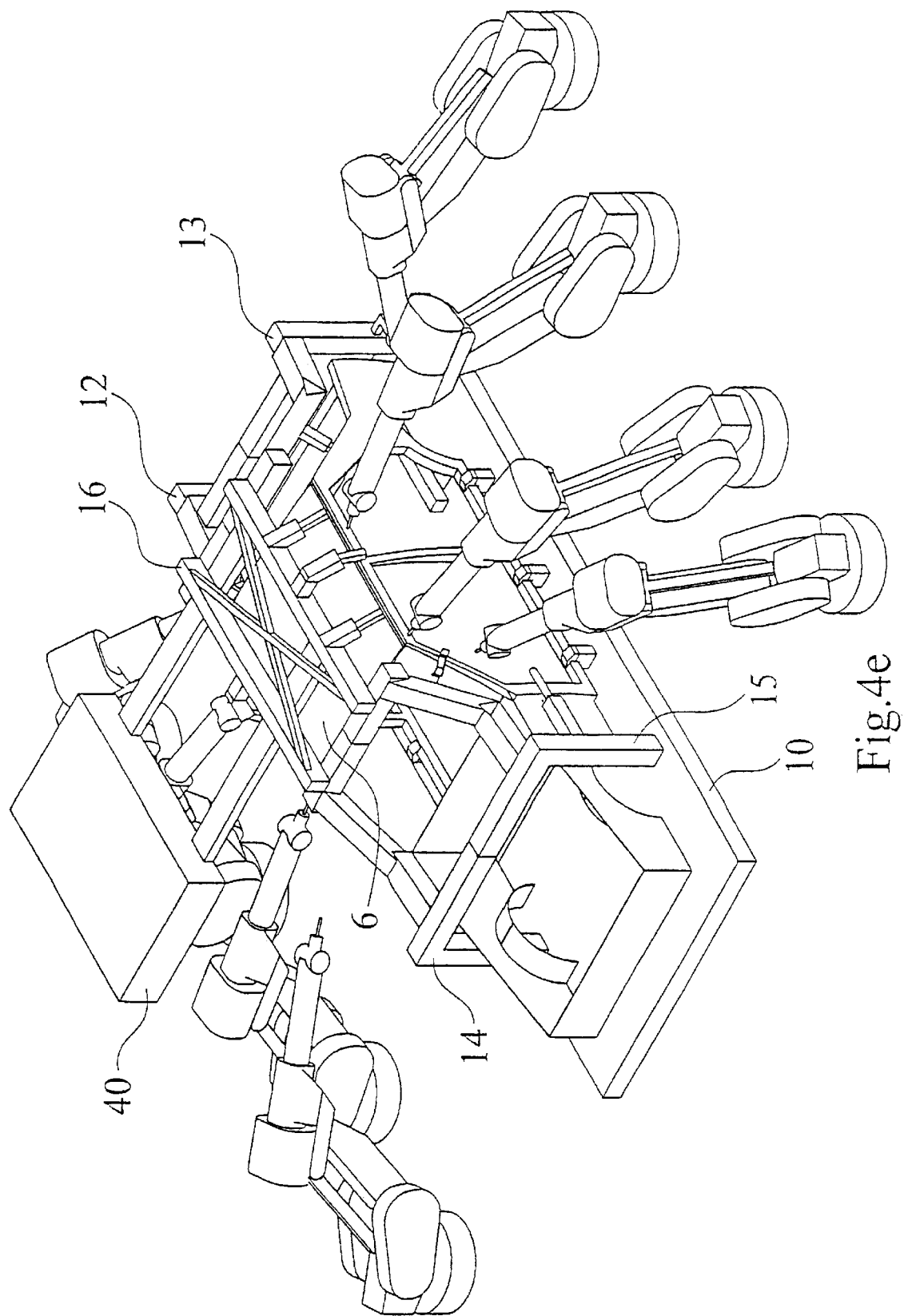

It is even possible to use asymmetric framing elements, if it is seemed necessary. The designer of the clamping net 11 is free to use any forms and any symmetrical or asymmetrical constructions and forms, which might be necessary due to eg. the shape of the car body, the general construction thereof or the required assembly and/or welding operations. For instance, a step of the assembly called "roof injection" may require an asymmetrical, from the other side more open net or a net structure which is partially removable or might be "opened" (see eg. FIG. 4e).

The inventive locking (clamping) arrangement, which will be described in more detail with reference to FIG. 5, enables a secure, rigid and accurate fastening of various elements to each other and to the bed means or carriage 10 in a manner, which further assists in the aim to obtain as light and open framing construction as possible, which still gives a solid and rigid support to the subsequent framing operations, such as for the welding.

The operation of one preferred embodiment will now be discussed in more detail with reference to FIGS. 3a–3f, which are-views of a performed computer aided simulation for the operation of the described arrangement. It is to be noted that, for the shake of simplicity, all views do not necessarily show all utilized components or devices, but they may show only those devices which are essential for that particular step.

Figure 3A:
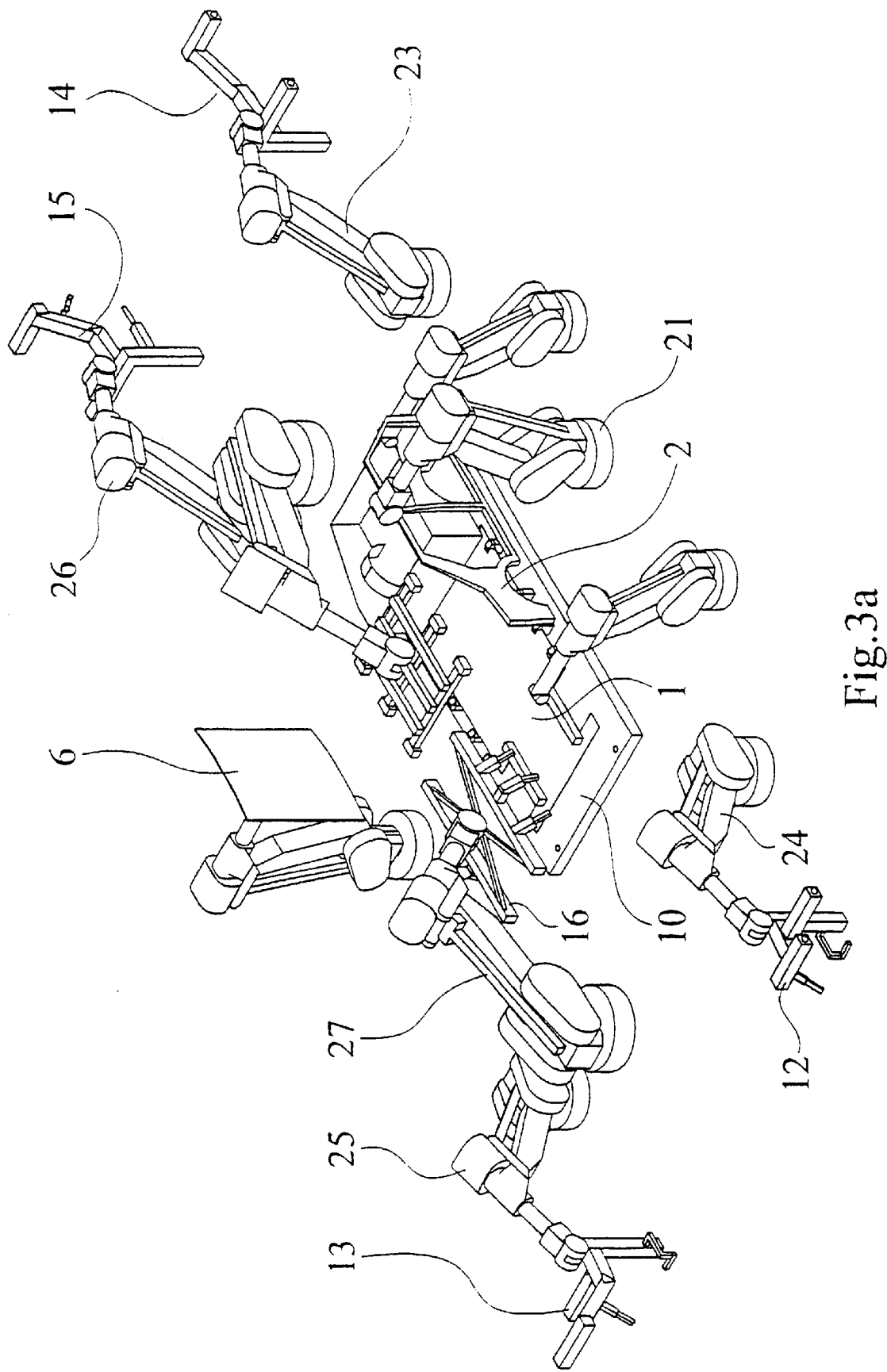
FIGS. 3a, 3b, 3c, 3d, 3e and 3f are schematic perspective views of the operational principles according to one embodiment of the present invention, showing the mains steps of one operation cycle in accordance with the present invention.

FIG. 3a shows a stage in which the operation cycle has just initiated the preassembling step. It can be seen that the body bottom plate 1 has been assembled on the bed means 10 and that an industrial robot 21 is assembling the right side panel 2 relative to the bottom plate 1. Robots 24 and 25 have already gripped to the framing elements 12 and 13, respectively, and are holding them such that the elements are ready for the assembly in the next stage. Robots 23 and 26 are holding the front end framing elements 14 and 15, respectively.

The ways to attach a bottom plate 1 to the bed means 10 are per se known by the skilled person, and will thus not be explained in more detail. The attachment may be done in a separate station or in the framing station.

In one alternative arrangement the bed means 10 is formed by a carriage, onto which the bottom plate 1 is preassembled in an earlier stage, whereafter the carriage is brought into the framing station carrying said bottom plate 1. The carriage 10 may be of any suitable type, such as eg. an automatic guided vehicle, a shuttle conveyor, a carriage on an assembly line or a similar per se known apparatus. The carriage 10 may also include necessary information concerning the body model, eg. by means of a code carrier, bar code etc. suitable arrangement. According to one alternative, the bottom plate 1 might be brought onto a fixed bed means 10 by robots, and is then clamped to the bed means by the clamping means at the beginning of the cycle.

Figure 3B:
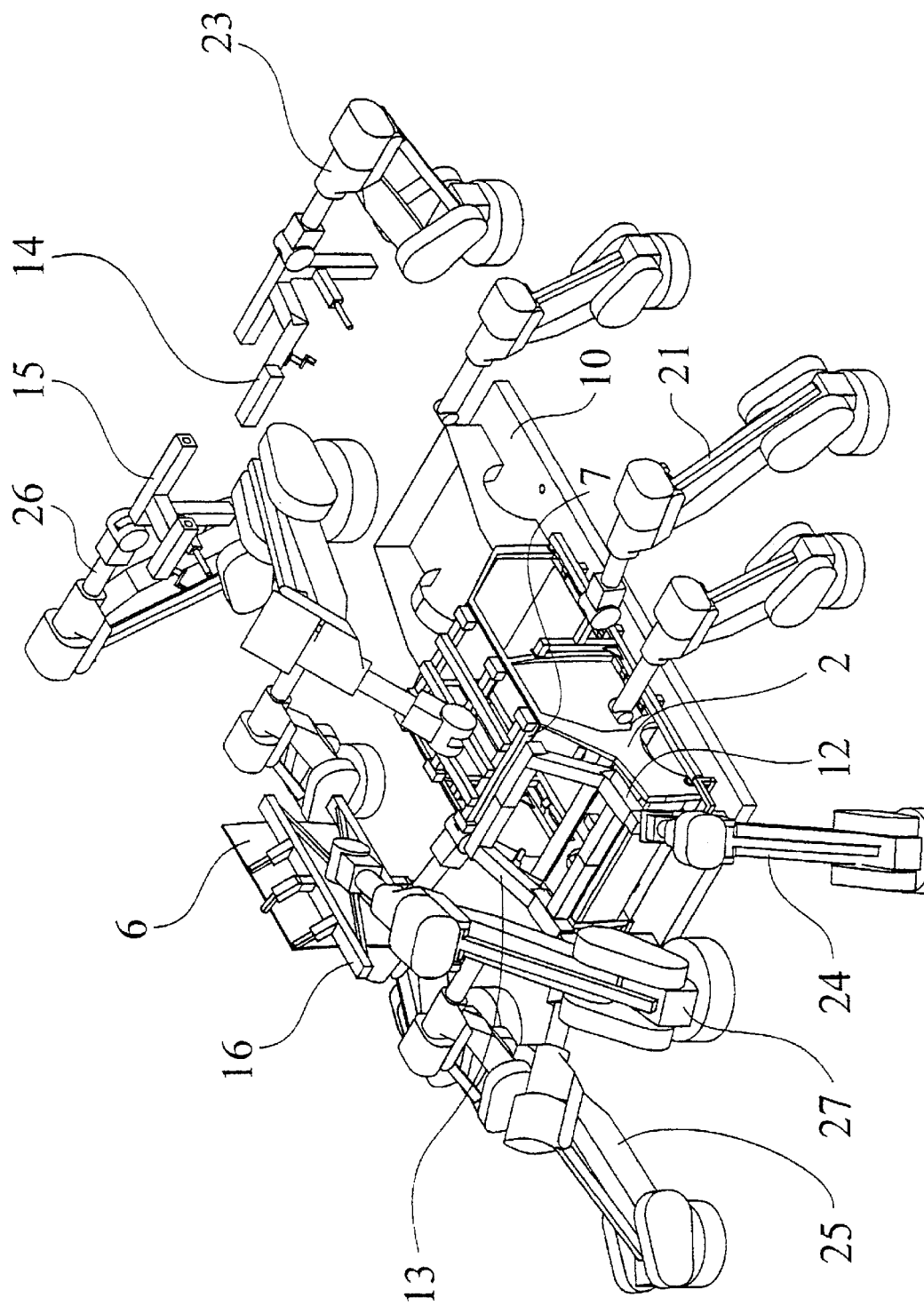

In FIG. 3b the preassembly proceeds further, and even the left side panel, and the rear and front end cross members 4 and 5 or similar means as well as the roof cross members 7 have been assembled into their positions, for instance by robots 21 and 27 especially adapted for this purpose. It is possible to use various suitable techniques for the "loose" or light attachment of the components at the preassembling stage to prevent the body components to disengage from each other and from the bottom plate 1 attached on the bed means 10. Various "toy joints". bendable clips, clamps or rivets, and gluing and tag welding, which all are well known by the skilled person, are given herein as an example of such suitable preassembly means. Said preassembly and handling of the body components are operated by the robots provided with suitable gripping and preassembly tools. The result of the preassembly operation will be a lightly or loosely assembled car body. In this example, however, the roof plate 6 will not be disposed at this stage, but will be brought into its final position later.

FIG. 3b shows also the rear end framing elements 12 and 13 which are about to be disposed in their final position by the robots 24 and 25, respectively. The front end framing elements 14 and 15 as well as the top element 16 are shown in their way towards their final positions in the clamping net by means of the robots 23, 26 and 27, respectively.

Figure 3C:
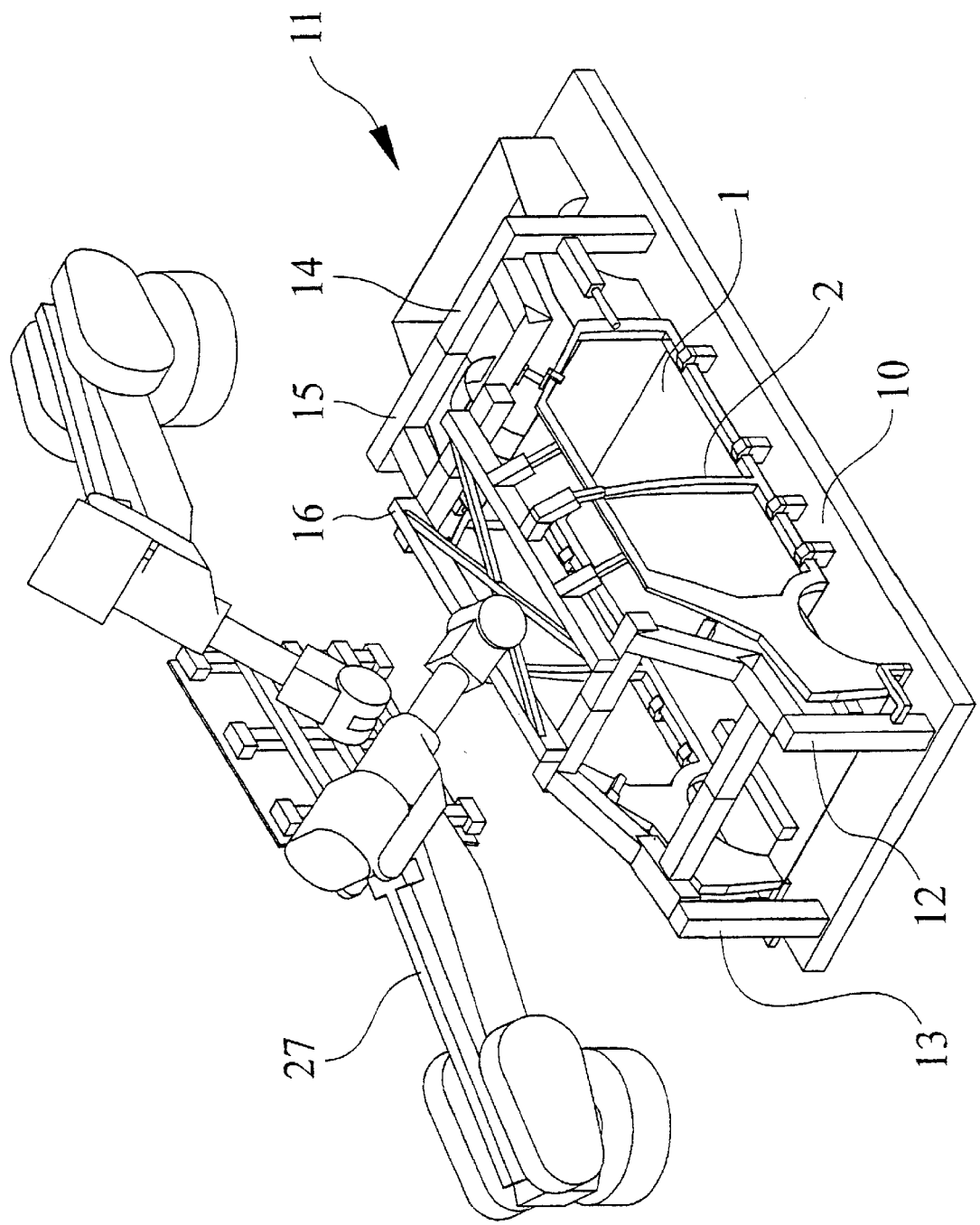

In FIG. 3c the framing net II is closed after the robot 27 has placed the top element 16 into its position into engagement with the elements 12, 13, 14 and 15 such that the front end elements 14, 15 and the rear end elements 12, 13 are clamped together by the top element 16. The clamping net 11 is now ready, and the body is framed, ie. supported, in a manner which is sufficiently rigid for the subsequent assembly operations as is shown in FIGS. 3d and 3e.

Figure 3D:
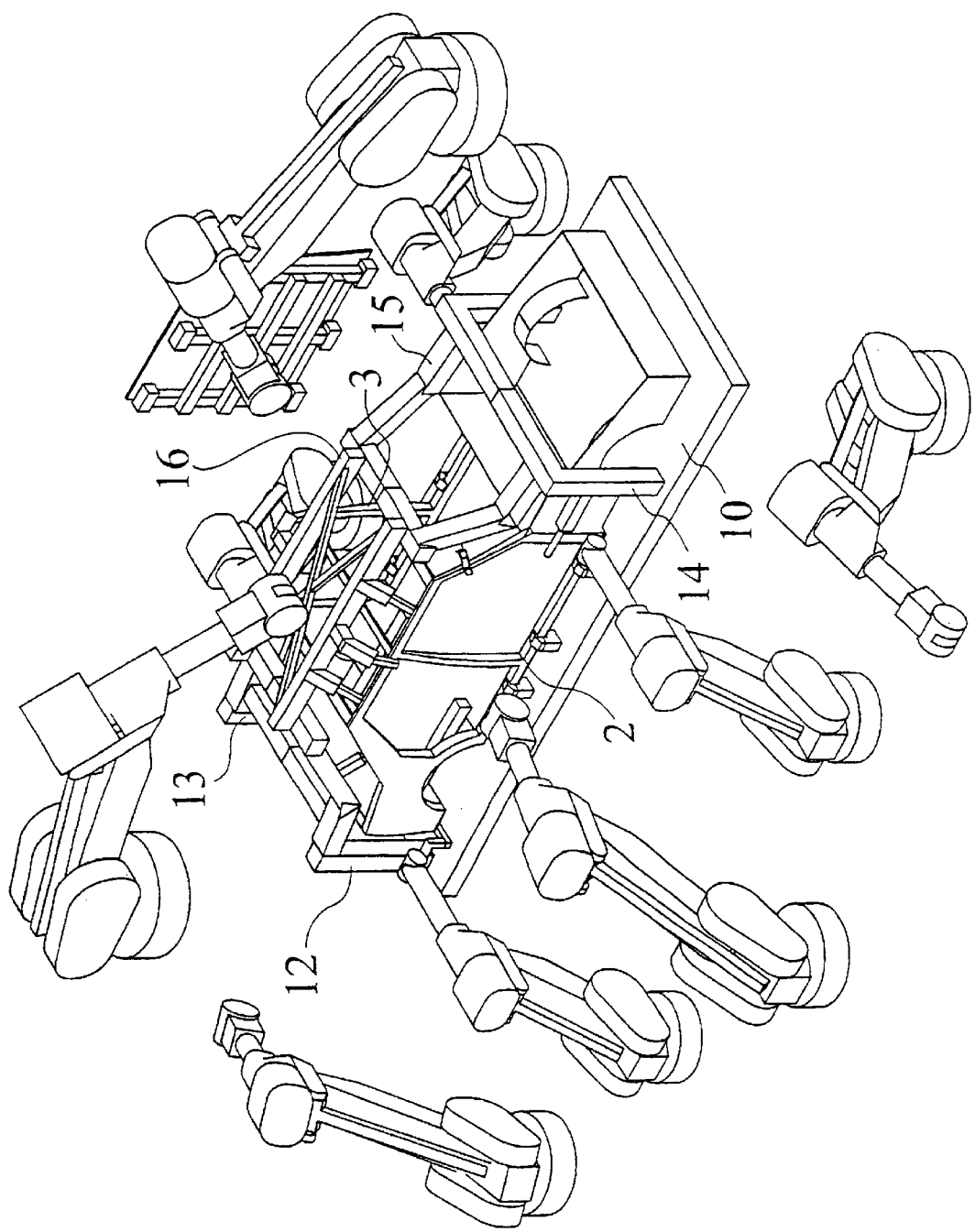

FIG. 3d shows a first welding stage wherein the robots are welding the body in a per se known manner. At this stage the side panels 2 and 3, the cross members and the bottom plate 1 are tag-welded to each other in an appropriate manner. In FIG. 3e the robots are continuing tag welding the predefined points of the body. In addition, the assembly robots are inputting the roof plate 6 into its final position relative to the car body, whereafter it will become welded in an appropriate manner to the rest of the body.

Figure 3E:
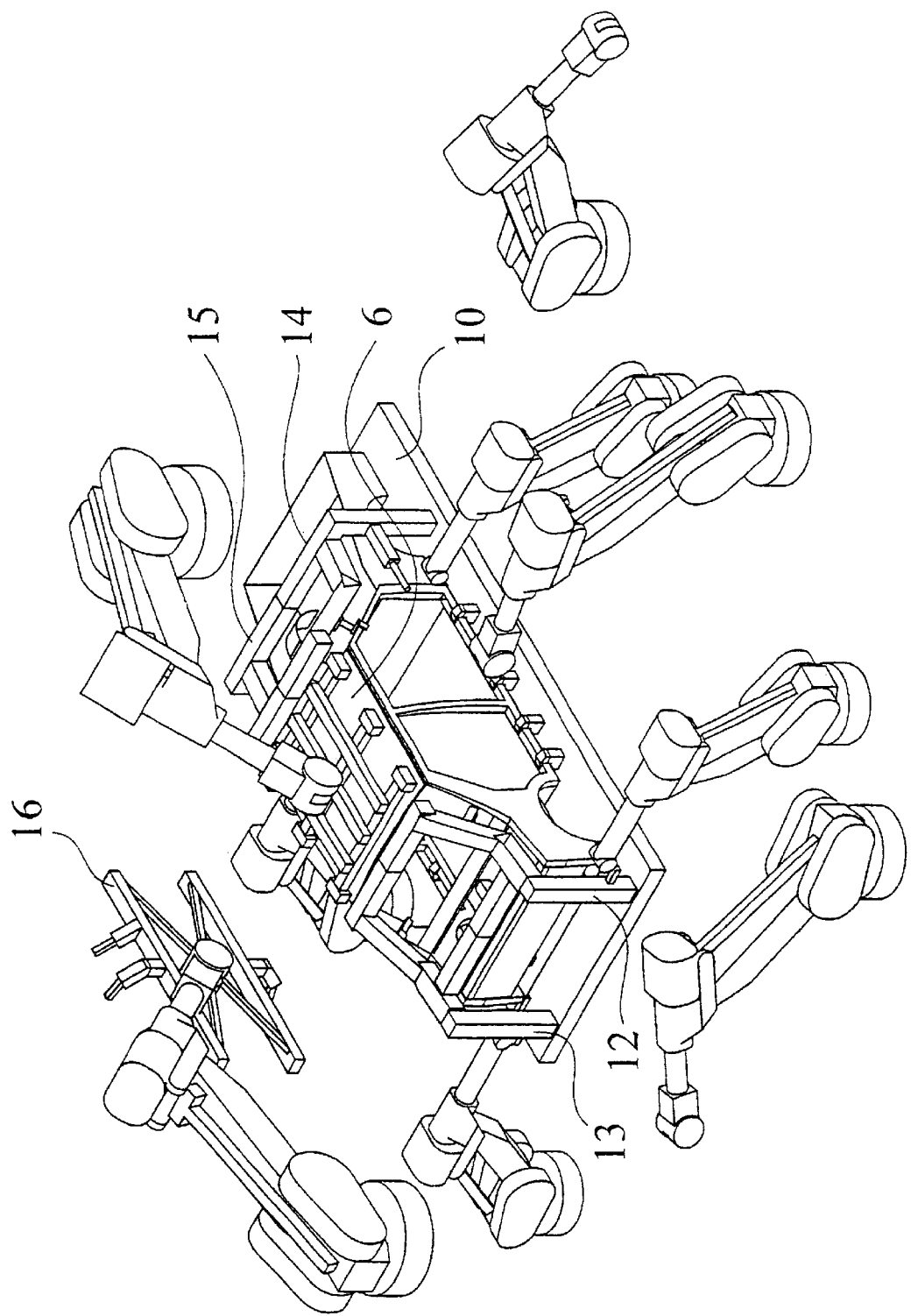

As disclosed by FIG. 3e, the body components are now tag-welded sufficiently rigidly to each other, and thus it is possible to open the clamping net, i.e. remove the framing element 16 temporarily such that the roof plate 6 is easy to assemble eg. by one of the robots. The roof inputting stage may include substages for inputting an additional cross member firstly to the roof portion of the car body and only thereafter inputting the actual roof plate 6.

According to one alternative the welding robots are different than those robots performing the framing and body component preassembly functions, as the general requirements for a welding robot and for an assembly robot are different, and they require different tools and programming. Another advantage obtained by using separate robots is that the overall cycle time can be minimized by this.

However, in some occasions it is, of course, also possible to utilize a suitable tool change arrangement and to use the same robots, or at least a part of the assembly robots, for all of the necessary operations. By this manner the number of robots needed can be reduced, and the total number might be 5 or so. This leads into a relatively cost effective arrangement which can be advantageously used especially when manufacturing relatively low volumes of car bodies, where slightly longer operation cycle times might be acceptable.

Figure 3F:
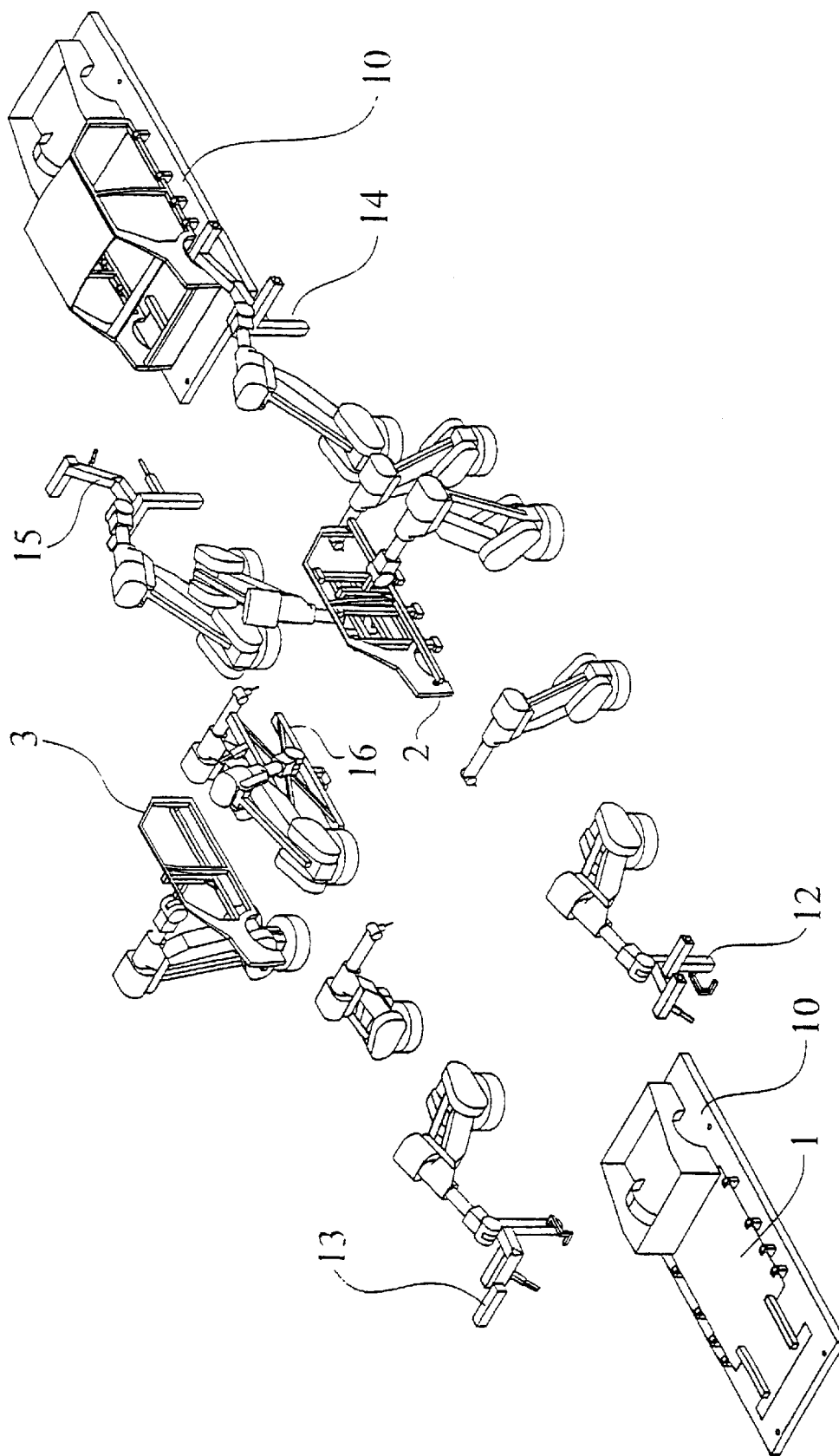
Figure 6:
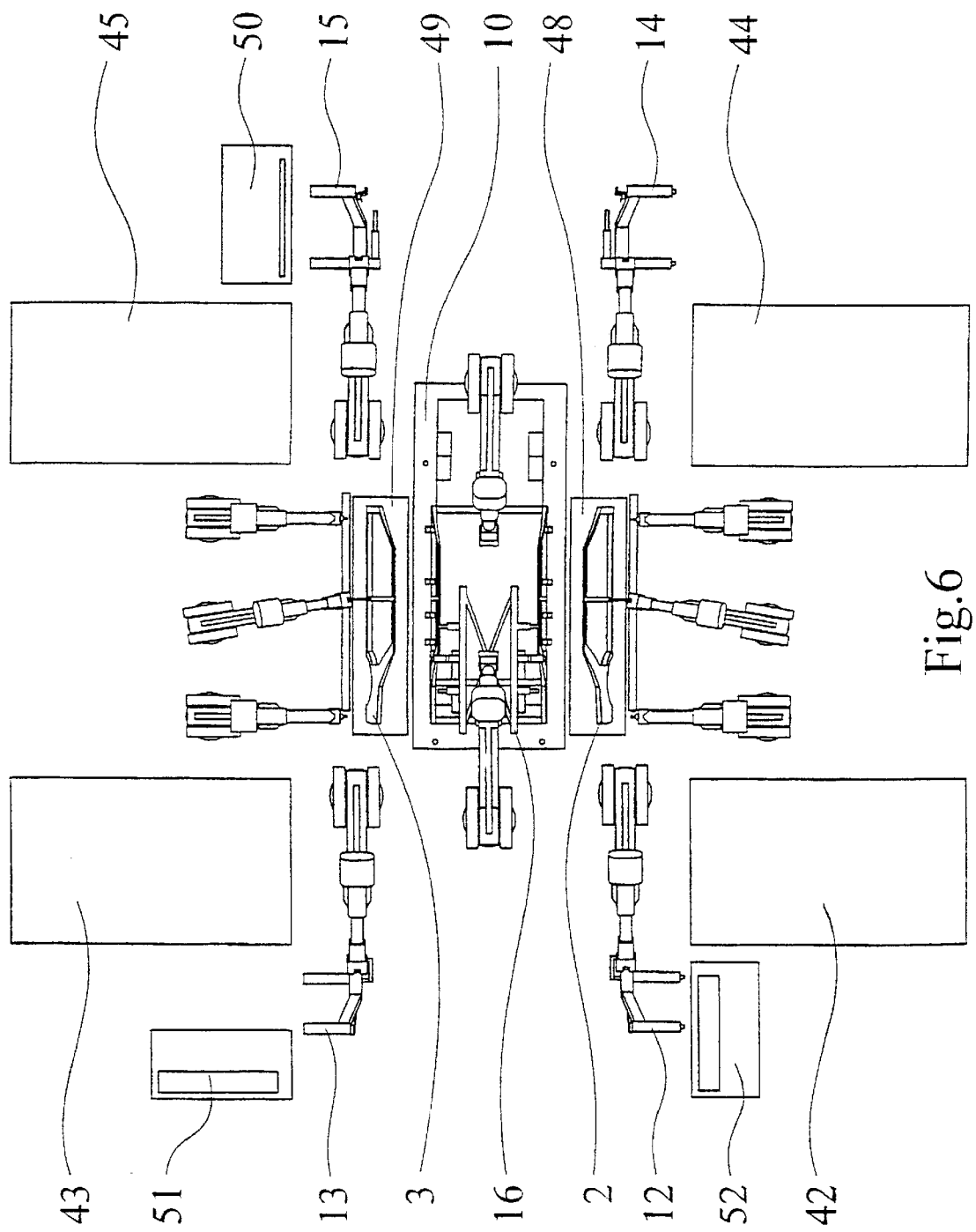
FIG. 6 discloses a schematical general view of one framing station arrangement.

FIG. 3f shows the end of the cycle. A completely welded car body is leaving the framing station on the bed means 10, and next bottom plate 1 is about to enter the framing station on a next bed means or carriage 10. The side panels 2 and 3 are already held by the appropriate robots and are thus ready for the preassembly. In case the car model has not changed between these subsequent bodies, all the settings of the robots and tools and the framing elements 12 to 16 will remain the same. However, if the next body is different, the settings, such as the programs, gripping tools. framing elements etc., will be automatically selected and changed accordingly prior to the start of the framing operations of the subsequent car body. One suitable arrangement for the framing station with suitable storage and/or supplying facilities for different framing elements and body components is shown in FIG. 6.

FIGS. 4a–f are views of another simulation performed to another embodiment according to the present invention. The main difference in operation to the arrangement according to FIGS. 3a–f can be immediately seen from the general view of FIG. 4a: this arrangement comprises separate welding and preassembling stations. In addition, this exemplary arrangement is such that it includes two separate preassembling stations 100 and 102, which both feed the single welding station 101. Furthermore, a roof injector 40 is disclosed as a part of the welding station 101.

Figure 4F:
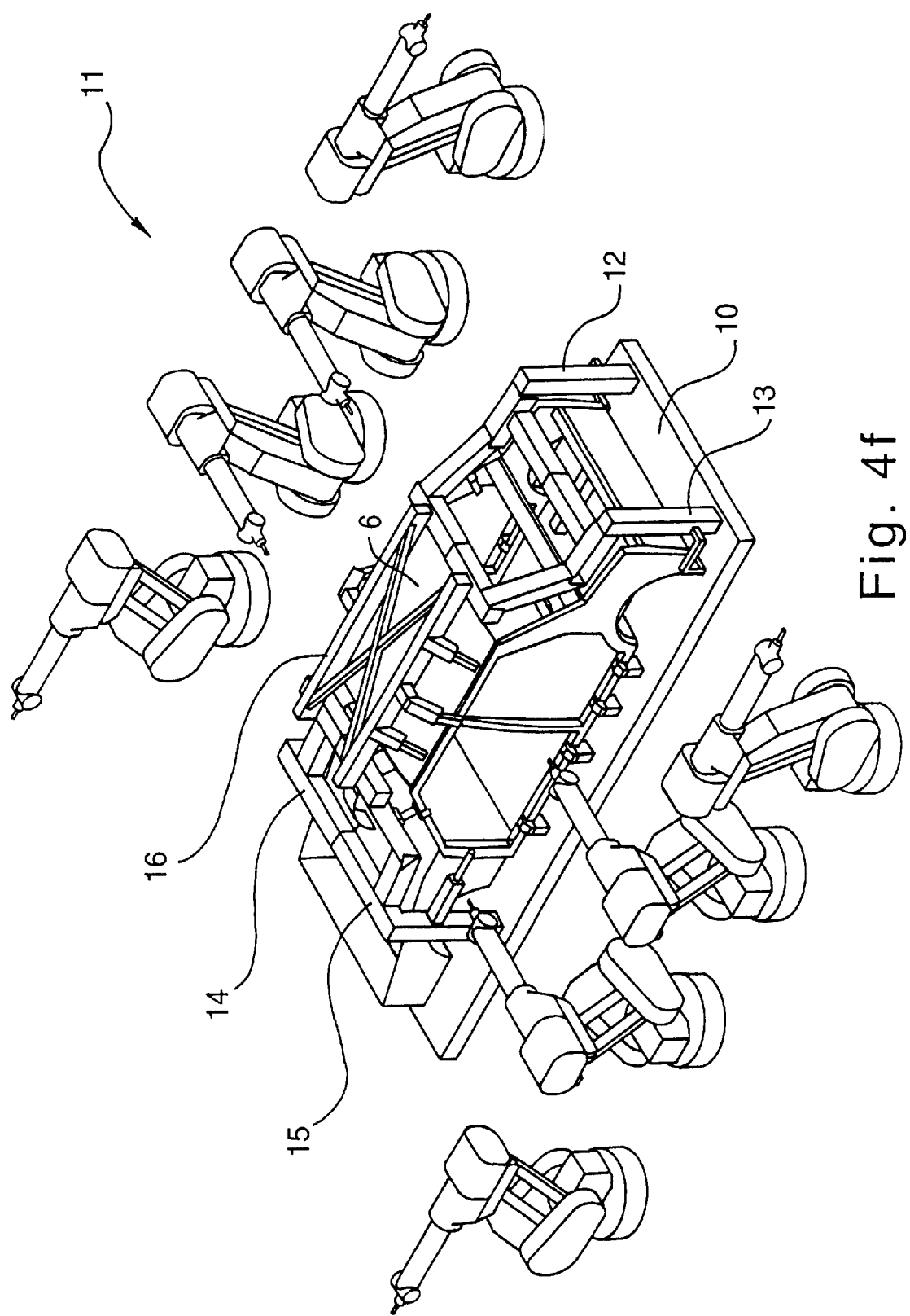

The steps of the light preassembly of the body components (FIG. 4b) and the closing of the clamping net (FIG. 4c), will essentially correspond to the steps of the arrangement of FIGS. 3a–f. Subsequent to the step accomplished in assembly station 100 and disclosed by FIG. 4c, the carriage 10 will be transferred to the separate welding station 101, and the first welding stage (FIG. 4d) and the input of the roof plate and tag welding operations (FIG. 4e) will be performed therein. The roof plate 6 is inputted by a so called roof injector device 40, which penetrates the roof plate 6 horizontally into its final position. FIG. 4f shows the end of the welding cycle, from which the welded body will be returned on the carriage 10 to the preassembling station 100 or 102 for the disassembling and removal of the framing net 11.

The advantage of the above system is that the system operation time can be enhanced even more, as the welding station 101 and the robots thereof are working, ie. welding, effectively through out the entire shift. In other words, the average waiting time of the special welding robots will be minimized. As the operations for the preassembly, the mounting of clamping net 11 and the removal of the clamping net 11 in general require slightly more time, and as the clamping net 11 has to be firstly assembled prior to the welding operations and to be removed thereafter, this kind of arrangement is, in some circumstances, found in simulations to provide more effective operation of the entire system such that the down times of the main apparatus and components is minimized.

Figure 5:
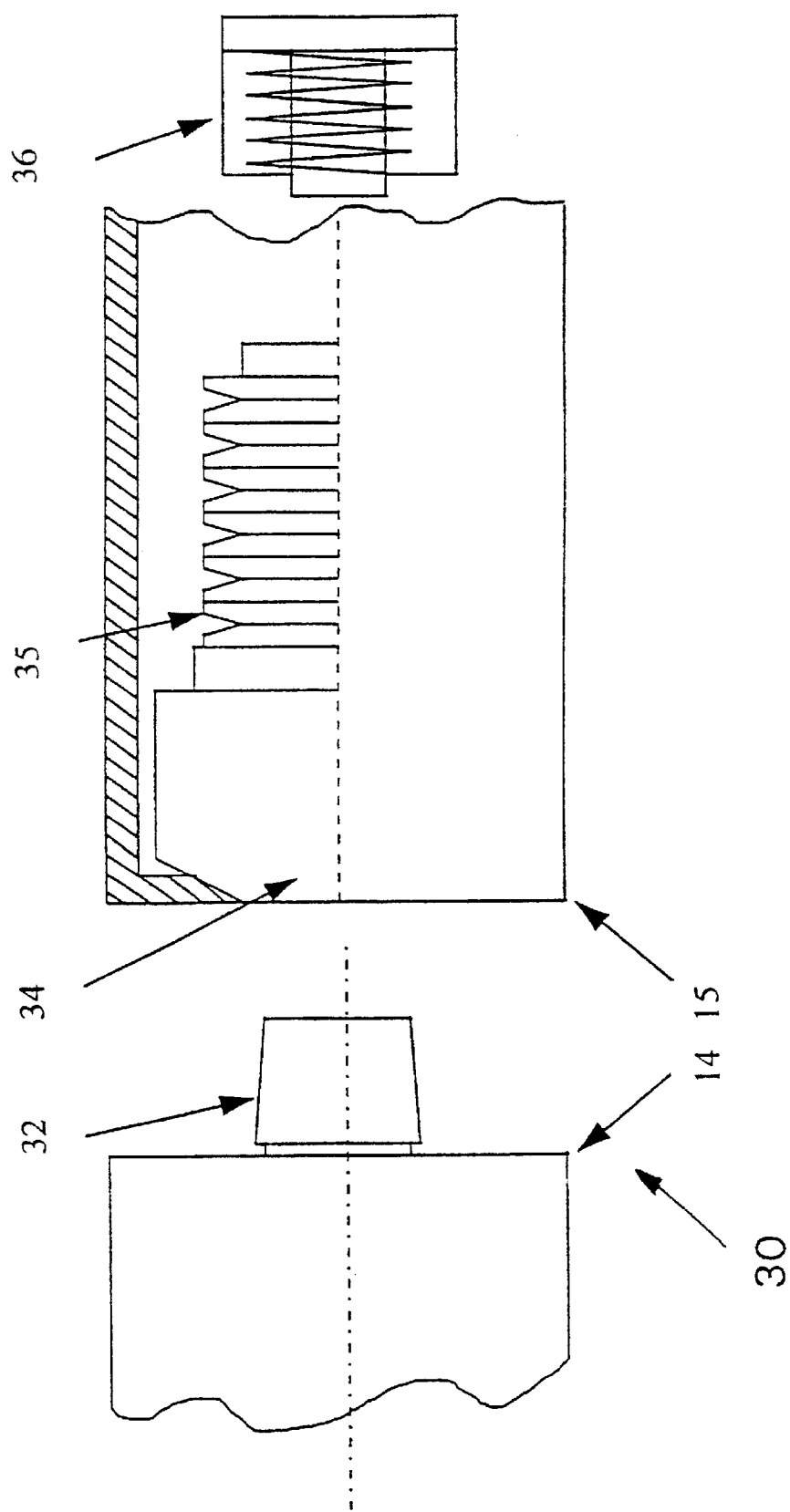
FIG. 5 discloses a schematic and partially sectioned view of suitable means for locking the support net elements to each other.

FIG. 5 discloses a schematical presentation of a preferred locking arrangement 30 for the clamping net between the framing elements, such as 14 and 15, of the present invention. The disclosed locking unit 30 consists of a per se known locking system which is conventionally used in connection with machine tools, and more precisely, used as automatic machine tool holders.

As an example of suitable automatic tool holder systems the following are referred to: Widaflex UTS™ by KRUPP WIDIA GMBH and Coromant Capto™ by SANDVIK AB. These both are automatic clamping units, from which the first can be actuated by a mechanical rotational movement or by a hydraulic pressure, by means of which the tool supported by a tapered arm (male part) is tightly and precisely, but removably locked into the correspondingly tapered holder (female part). In the latter the locking force is caused by powerful spring means which in turn are actuated by hydraulic fluid. A corresponding automatic and hydraulic tool locking system is disclosed by U.S. Pat. No. 4,864,714 (Von Haas et al.), which is also incorporated herein as reference. The locking and releasing time for these locking systems is less than one second. (For further technical details of these locking systems, see eg. brochures by the above manufacturers).

As an example of the forces these systems are in general able to stand and the accuracy and operation time they are able to provide, DIN standard 69 893, Teil 1 is referred to, said standard describing the general characteristics of so called HSK hollow tapered shanks for machine tools.

The exemplary arrangement of FIG. 5 includes a locking unit which utilizes a hydraulically operated automatic locking system. An abutment joint 30 of framing elements is disclosed, wherein a male part or cone 32 of the locking arrangement 30 is disposed at the beam end of element 14, and a female counterpart 34 including clamping means 35 is disposed inside the beam end of the element 15 such that when the male part 32 is penetrated inside the female part 34 and the clamping operation has been performed, the locking unit 30 will provide a rigid, secure and accurate joint between the respective elements 14 and 15. In the example the clamping means 35 comprise a plate ring set, which is arranged to lock the male cone 32. A hydraulic (or pneumatic) cylinder 36 is arranged to actuate the plate spring set 35 such that the plate spring set is, and thus also the male cone 32, is released by said. cylinder 36.

It is to be understood that the similar arrangement can be provided to the other joints of the net structure as well, even though the shape of the joints does vary from the abutment joint to T- or L-joint, or may be arranged in an different angles, such as having 25°, 30° or 45° angle between the two mating elements. In other words, the joints can be of any shape (see eg. joints between the roof element and the element 14 or between the bed means 10 and the element 14 in FIG. 2).

When using the mechanical arrangement, the rotational clamping movement can be performed by one of the robots, or eg. by a small and simple servomotor disposed in connection with the locking unit in the framing element. When using hydraulically operated clamping units, such as in FIG. 5, the pressurized hydraulic fluid must be conducted into the locking unit 30 by an appropriate manner.

One solution is to use suitable hydraulic lead-through or coupling means in the robot arms which are per se well known by the skilled person. These will connect the internal hydraulic system of the framing element to the central source of pressurized hydraulic fluid. A lead-through is preferably provided in the end of the robot arm adjacent to or inside the gripping means used for holding of the support element. A hydraulic line or hose provided in connection with the robot arm will connect the lead-through to said source of the hydraulic fluid in a controlled manner. In case pneumatically operated means are used to provide the gripping of the support elements to the body components, it is possible to lead the pressurized air through the same lead-through unit to the support elements. In addition, all other connections, such as conduits for electrical control signals etc. medias, are preferably combined to one single lead-through unit.

The framing elements may alternatively include fluid conduits which are connected to a central source of pressurized hydraulic fluid. The hydraulic fluid can be supplied to the various locking units in different framing elements eg. through a hydraulic circuit arranged in connection with the bed means, wherein the fluid is conducted to the locking means through suitable hydraulic lines and connectors.

One solution is to use suitable hydraulic lead-through or coupling means in the robot arms which are per se well known by the skilled person. These will connect the internal hydraulic system of the framing element to the central source of pressurized hydraulic fluid. A lead-through is preferably provided in the end of the robot arm adjacent to or inside the gripping means used for holding of the support element. A hydraulic line or hose provided in connection with the robot arm will connect the lead-through to said source of the hydraulic fluid in a controlled manner. In case pneumatically operated means are used to provide the gripping of the support elements to the body components, it is possible to lead the pressurized air through the same lead-through unit to the support elements. In addition, all other connections, such as conduits for electrical control signals etc. medias, are preferably combined to one single lead-through unit.

The operation of the locking means 30 will be controlled by the central control unit (not shown) controlling the overall operation of the framing arrangement. The control unit may comprise a computer or a microcomputer. The control system may also include several valves, sensors, switches etc. control devices per se known by the skilled person, and thus not explained in more detail herein.

The strength of the supporting means net constructed with the locking devices described above was analyzed by so called FEM-analysis (FEM=Finite Element Method). The surprising result was that even though the general construction of the supporting means net 11 is essentially lighter and more open than in the prior art systems, it was found to fulfill the requirements for the mechanical strength set forth for framing devices. Therefore the describe apparatus and method was surprisingly found to provide a significant improvement, as it enables the use of essentially lighter and smaller framing elements, which has an positive effect to the size and costs of the required handling apparatus and as a matter fact, enables the use of the essentially cheap standard robots for these purposes.

FIG. 6 discloses a schematic general top view of one framing cell according to the present invention and including several robots, as discussed above. A part of the robots are for the welding operations, a part for the preassembly of the body members and for the assembly and removal of the clamping net, and a part for multipurpose use. Storages or magazines and/or supplying means for the different framing elements and/or body components are disposed around the station such that the elements and components stored therein can be reached by the respective robots as will be explained in the following.

The different front end framing elements 14 and 15 as well as rear end elements 12 and 13 are stored in magazines 44, 45 and 42, 43, respectively. The skilled person knows various suitable alternatives for such magazines, which alternatives include arrangements such as simple shelves, different paternoster arrangements, conveyor arrangements etc. storage means. Thus they are not described in more detail herein. A feature for a suitable magazine is that the framing elements can be picked up and placed back to the magazine by the respective robot.

Correspondingly, car body component magazines 50, 51 and 52 are also disclosed. The operational principles thereof may substantially correspond to those of the framing element magazines. However, as the framing elements 12 to 16 are repeatedly retrieved and returned to the magazine, the car body components will only be picked up once from the magazine and subsequently assembled to the car body. This may lead to some differences between the types of these two magazines. For example, the body component magazines may only be buffer storages for body components conveyed to the respective buffer storage by suitable conveyor means (not shown). Suitable arrangements for this purpose are per se known by the skilled person, and thus not explained in more detail.

From the disclosed magazines, the magazine 50 is for front cross members, the magazine 51 is for the rear cross members and the magazine 52 is for further rear cross members.

In the example, the side panels 2 and 3 are supplied for the respective robots by means of conveyors 48 and 49, respectively, disposed above the cell in a per se known manner. Thus the side panels 2 and 3 will be supplied from above the cell.

According to one alternative the side panels might also be conveyed into the cell by means of the carriage 10, or could be stored in magazines in a manner similar to the other body components. It is also possible to make a loose initial preassembly of the body components or a part thereof outside the cell on the carriage 10. This can be even performed manually. However, at present it is believed that the assembly line can be made substantially shorter if all the preassembly and welding operations are performed in one single cell, as is disclosed in FIG. 6.

The roof framing element 16 of the example of FIG. 6 might be designed such that it could be used in various supporting nets for different car models, and thus FIG. 6 does not disclose any special storage for it. The element 16 might even include several points for the attachment (ie. several counterparts of the locking means) of eg. the rear or front support elements 12 to 15 such that bodies of various lengths might be framed by one single roof support element 16. However, each body model may have a top component of its own, and thus a suitable storage or supply arrangement for the roof or top element 16 might also be required. This magazine or supplying system might also be positioned above the cell.

In addition, even the other net elements 12 to 15 might be arranged such that one element suits for several body models. For example, similar front elements could be used for sedan, station wagon and sports roof models.

Figure 7:
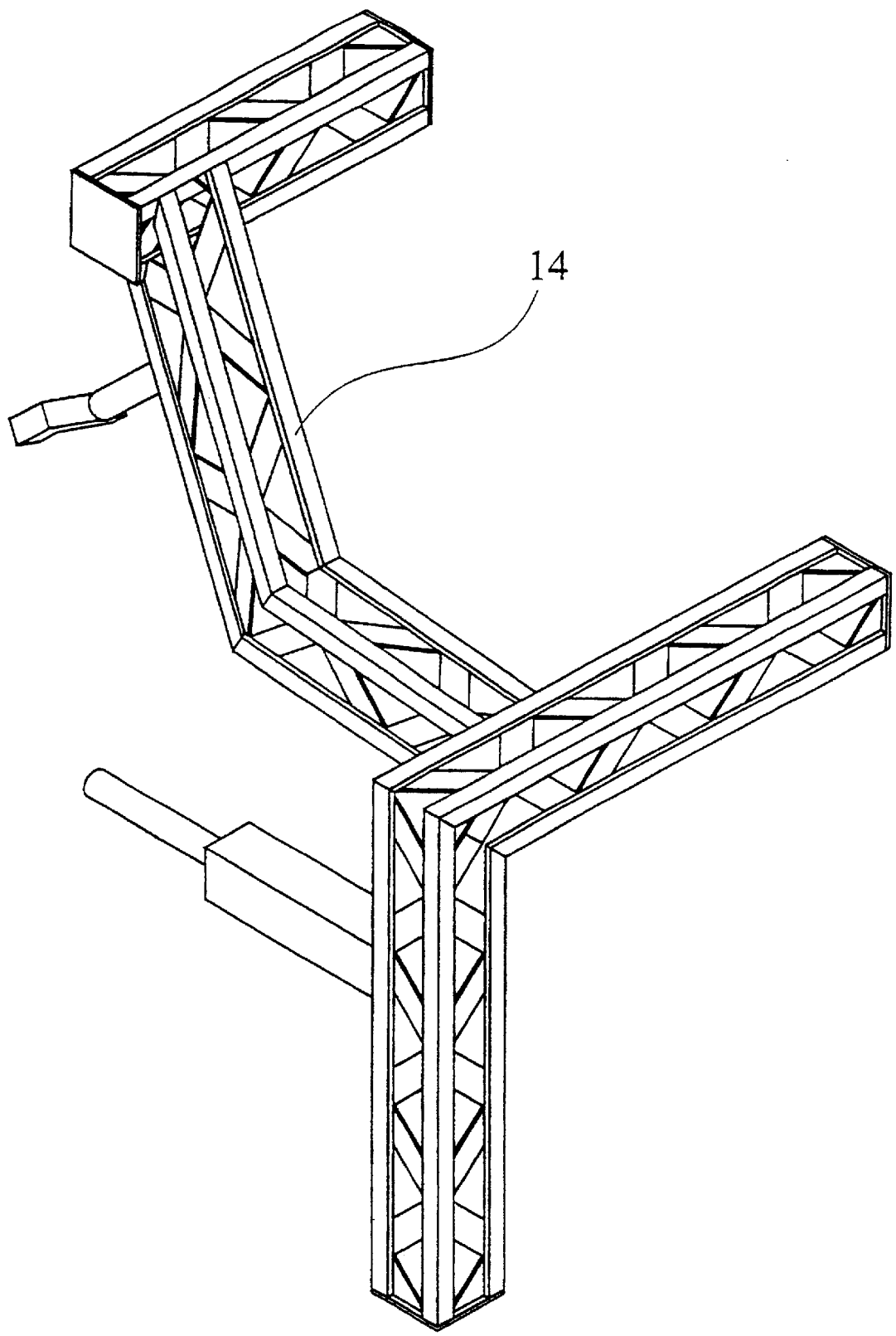
FIG. 7 discloses one alternative support element construction.

FIG. 7 discloses a further embodiment, according to which the support elements, such as the illustrated support element 14, are provided by means of a lattice structure. The exemplifying lattice structure of FIG. 4 is arranged by L-profiles extending in the corners of the beams of the element 14 and diagonal members extending between the L-profiles. By means of the lattice structure it is possible to achieve benefits in view of the total weight of an individual support element, while the construction provides a solid and rigid structure. It is to be noted that the lattice structure can be provided only to a portion of an element, such as to one or two intermediate beams thereof, or that only a part of the elements of the support net are provided with a lattice structure.

According to one embodiment the elements from which the support net structure is formed are made at least partially of aluminium or similar light metal or alloy metal. According to one alternative the material is carbon fibre, fiberglass, or an appropriate composite material, preferably reinforced composite material. The above materials can naturally, be utilized in connection with all kinds of element constructions, such as the closed beam structure of FIG. 2 or the lattice structure of FIG. 7, or in constructions where U beams, L beams, T beams or other suitable types of beams or posts are utilized to provide a rigid subelement of a framing net.

Thus, the invention provides an apparatus and a method by which a significant improvement in the area of framing car bodies in an automatic, flexible and reliable manner. However, it should be noted that the foregoing examples of the embodiments of the invention are not intended to restrict the scope of the invention to the specific forms presented in this connection but rather the present invention is meant to cover all modifications, similarities and alternatives which are included in the spirit and scope of the present invention, as defined by the appended claims. For instance, upon reading the above description together with the annexed drawing it will be obvious to the skilled person to use, instead of bed means, such a support means which are in a vertical position or otherwise than horizontally positioned. In addition, it will be clear to the skilled person that the robot can be replaced by any suitable means capable of performing spatial or three dimensional movements, such as by suitable manipulator or similar automatic handling devices, and thus the term robot is to be understood to cover all such means in this context.

What is claimed is:

1. A framing station arrangement for framing a car body from a plurality of separate body components comprising:
   a bottom plate support means for receiving and supporting a bottom plate of a car body;
   attachment means for clamping the bottom plate on the bottom plate support means;
   a robot that brings at least one of the separate body components into engagement with the bottom plate;
   means for preassembling said body components relative to the bottom plate and/or relative to each other so that the external shape of the car body is achieved;
   support means formed from a plurality of separate support elements for supporting a preassembled car body;
   another robot that brings at least one of the support elements of said plurality of support elements into engagement with said bottom plate support means and/or at least another support element, wherein
   the support means are arranged to form a support means net wherein each of the support elements forming said support means net is clamped either to at least two other support elements and to said bottom plate support means or to at least three other support elements by locking means provided in the support elements.

2. An arrangement according to claim 1, wherein said locking means comprises a male portion attached to one support element and a female portion attached to a mating support element, and means for accurately locking said male portion into said female portion, wherein said locking is actuated by drive means arranged to automatically lock in response to a control signal from a control means.

3. An arrangement according to claim 2, wherein said locking means comprises an automatic machine tool holder.

4. An arrangement according to claim 2, wherein each robot includes an arm that is provided with lead-through means for providing a connection between the locking means of the support elements and a source of a pressurized hydraulic fluid and/or pressurized air.

5. An arrangement according to claim 2, wherein the drive means is one of either hydraulic, pneumatic, mechanical, and electrical.

6. An arrangement according to claim 1, wherein said support means net is arranged wherein the construction and shape of the said support means follows the shape and construction of the car body to provide accessibility to the car body for subsequent framing operations.

7. An arrangement according to claim 1, wherein at least one of the support elements is provided with gripping means for gripping the body components adapted to position and to hold the body components during the framing operations.

8. An arrangement according to claim 1, wherein at least one of the support elements is formed to fit a shape of a portion of the car body, said at least one of the support elements is adapted to support, and is provided with suitable positioning and/or bearing surfaces adapted to bear against the surface of the car body.

9. An arrangement according to claim 1, wherein the support elements are made from light metal material or light alloy material, or from a composite or reinforced composite material.

10. An arrangement according to claim 9, wherein said light metal material or light alloy material is aluminum and said composite or reinforced composite material is either one of carbon fibre and fiberglass.

11. An arrangement according to claim 1, wherein the support elements are at least partially constructed to form a lattice structure or reinforced light weighted structure.

12. An arrangement according to claim 1, wherein each of the individual support elements has a weight that is less than 300 Kg.

13. An arrangement according to claim 1, wherein the at least two other support elements form one support element pair extending over a width of the car body and are asymmetrical.

14. An arrangement according to claim 1, wherein the arrangement comprises at least two preassembling stations and a separate welding station.

15. A support apparatus to frame a car body from a plurality of separate body components, comprising in combination:
   a bottom plate support means for receiving and supporting a bottom plate of a car body;

attachment means for clamping the bottom plate on the bottom plate support means;

preassembly means for preassembling said body components relative to the bottom plate and/or relative to each other, wherein the external shape of the car body is achieved;

support means formed by a plurality of separate support elements arranged to be movable by a robot and clamped to each other to form a support means net for supporting a preassembled car body, wherein each of the support elements forming said support means net is clamped either to at least two other support elements and to said bottom plate support means or to at least three other support elements by means of locking means provided in the support elements; and gripping means for removably holding at least a part of the body components by the support means net.

16. An apparatus according to claim 15, wherein said locking means comprises a male portion attached to one support element and a female portion attached to a mating support element, and means for accurately locking said male portion into said female portion, wherein said locking is actuated by drive means arranged to provide an automatic locking in response to a control signal.

17. An apparatus according to claim 16, wherein said locking means comprises an automatic machine tool holder.

18. An apparatus according to claim 16, wherein the drive means is one of either hydraulic, pneumatic, mechanical, and electrical.

19. An apparatus according to claim 15, wherein the support elements are made from light metal material or light alloy material, or from a composite or reinforced composite material.

20. An apparatus according to claim 19, wherein said light metal material or light alloy material is aluminum and said composite or reinforced composite material is either one of carbon fibre and fiberglass.

21. An apparatus according to claim 15, wherein the support elements are at least partially constructed to form a lattice structure or reinforced light weighted structure.

* * * * *

UNITED STATES PATENT AND TRADEMARK OFFICE
CERTIFICATE OF CORRECTION

PATENT NO.    : 6,493,930 B1
DATED         : December 17, 2002
INVENTOR(S)   : Juha Raami It is certified that error appears in the above-identified patent and that said Letters Patent is hereby corrected as shown below:

<u>Title page,</u>
Item [12], "Raami" should read -- Kettunen --
Item [75], Inventor, "Juha Raami" should read -- Juha Kettunen --

Signed and Sealed this

Twentieth Day of May, 2003

JAMES E. ROGAN
*Director of the United States Patent and Trademark Office*